April 19, 1966
B. POLL
3,246,615
POT PLANTER
Filed Jan. 8, 1964
2 Sheets-Sheet 1
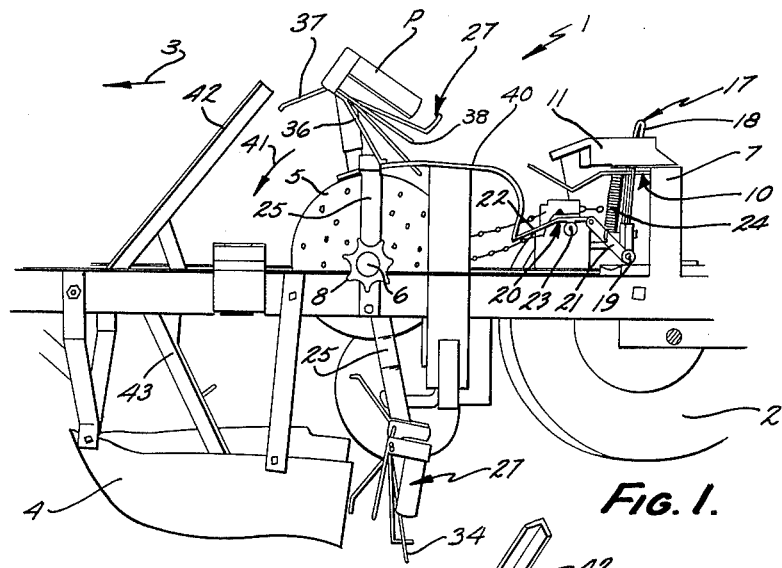
FIG. 1.
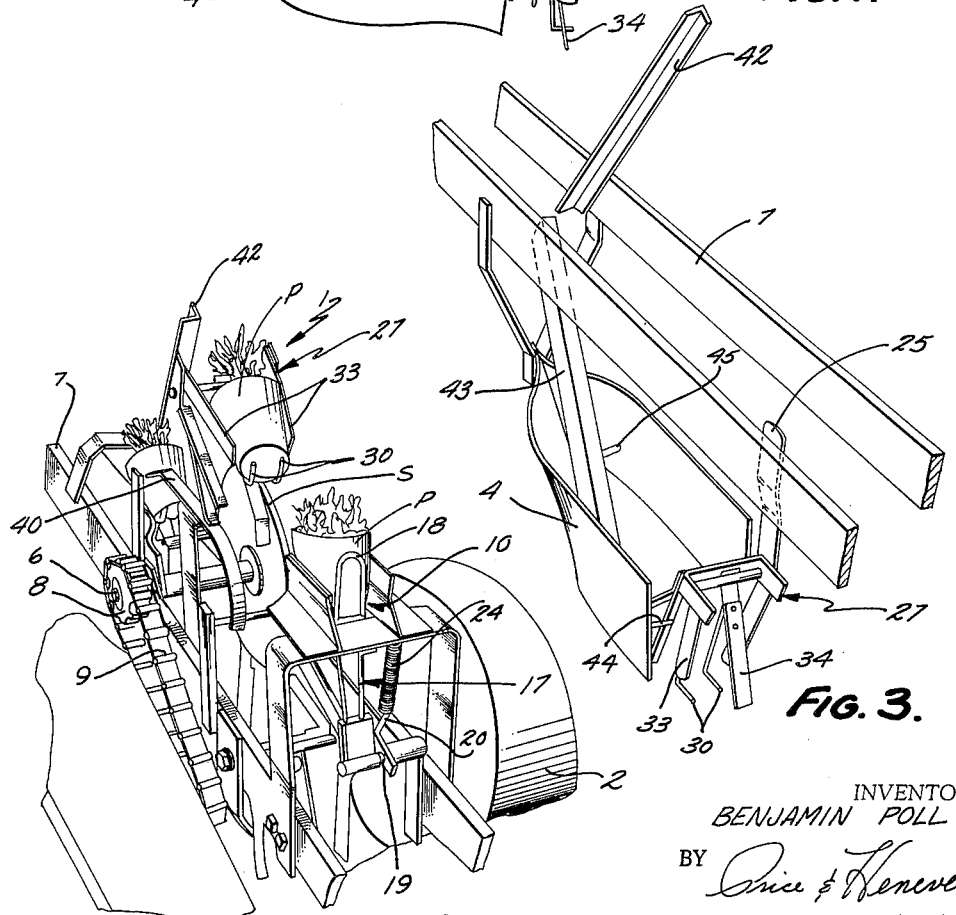
FIG. 2.
FIG. 3.
INVENTOR.
BENJAMIN POLL
BY
ATTORNEYS April 19, 1966     B. POLL     3,246,615
POT PLANTER Filed Jan. 8, 1964     2 Sheets-Sheet 2

INVENTOR.
BENJAMIN POLL
BY
ATTORNEYS

United States Patent Office 3,246,615
Patented Apr. 19, 1966

3,246,615
POT PLANTER
Benjamin Poll, Holland, Mich., assignor to Holland Transplanter Company, Holland, Mich., a corporation of Michigan
Filed Jan. 8, 1964, Ser. No. 336,579
17 Claims. (Cl. 111—2)

This invention relates to a planting machine. More particularly, this invention relates to a planting machine for planting potted plants, having means for grasping and depositing a potted plant in the ground.

It has been found advantageous to place plants in the ground together with a pot in which they have been planted. By placing both the plant and its pot in the ground, the grower is assured that the roots will not be damaged and proper fertilizer and growing agents surround these roots. Machines are already in existence which accomplish the planting of pots, a machine of this general type disclosed in by Patent No. 3,078,816, issued February 26, 1963. These machines already in existence, as described in this patent, have a plurality of arms which receive plants at a loading station and carry them to a planting position where they are released from the control of the machine. However, machines presently in existence have in certain instances not been entirely satisfactory. It is therefore an object of this invention to provide an improved pot planting machine.

A further object of this invention is to provide an improved pot planting machine which includes a semi-automatic feed and an automatic pot pickup to assure proper setting of the potted plants in the ground.

Another object of this invention is to provide such a machine with an improved tripping means for properly positioning and depositing a pot in the ground.

A further object of this invention is the provision of such a machine with improved facilities for transporting the plant from the pickup to the ground for planting.

A still further object of this invention is the provision of such a machine which is sure and more positive in function, in general providing better handling for the plants to be planted.

These and other objects of this invention will become apparent to those skilled in the relevant arts upon reading the following specification in conjunction with the accompanying drawings, wherein:

FIG. 1 is a side view of the planting mechanism of the improved planting machine of this invention;

FIG. 2 is a perspective top and rear view of the machine shown in FIG. 1;

FIG. 3 is an enlarged, perspective, top and rear view similar to FIG. 2 but showing only the tripping means and the lower portion of the planting apparatus;

Figure 4:
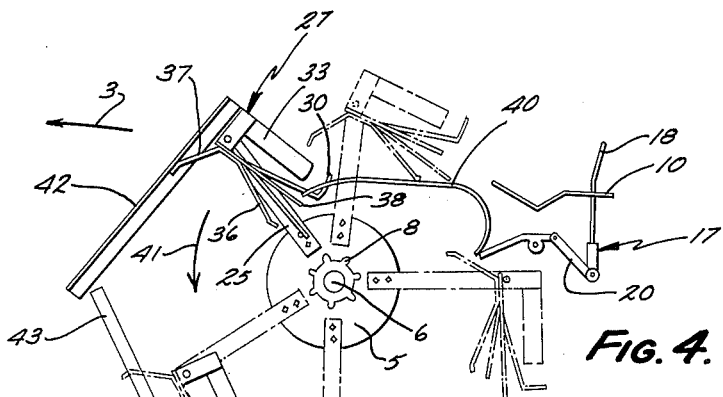
FIG. 4 is a side view of the planting apparatus, showing in dotted lines the various positions of the plant grasping elements.

Briefly, this invention relates to a machine for planting potted plants including a means for moving the machine along the ground and at least one arm associated with the machine having means for providing circuitous movement to the arm as the machine moves along the ground. A pot grasping element is pivotally secured proximate the free end of the arm. A tripping means for removing a pot from the element as the element engages the ground is provided.

Referring more specifically to the drawing, the reference numeral 1 designates the pot planting machine of the invention (FIGS. 1 and 3). The machine 1 is supported on wheels 2 for moving it along the ground in the direction of the arrow numbered 3. A means 4 is provided for digging a furrow in the ground in which to deposit potted plants. This general structure is already old and well-known to the art. A rotatable member 5 is mounted for rotation in a generally vertical plane about the shaft 6 supported on the frame 7 of the machine 1. The shaft 6 includes a sprocket 8, the chain 9 driving the rotatable member 5 through movement of the wheels 2. Trays (not shown) are mounted on the machine, as are seats (not shown) for workers, the workers removing pots from the trays and placing them on the pot platform 10. It is to be understood that the only work necessary to feed the pot planting machine of this invention is the placing of a potted plant on the pot platform 10. As will be seen hereinafter, this is a much simplified manner for feeding the pot planting machine, special alignments, fitting and the like by the workers themselves being eliminated.

Figure 6:
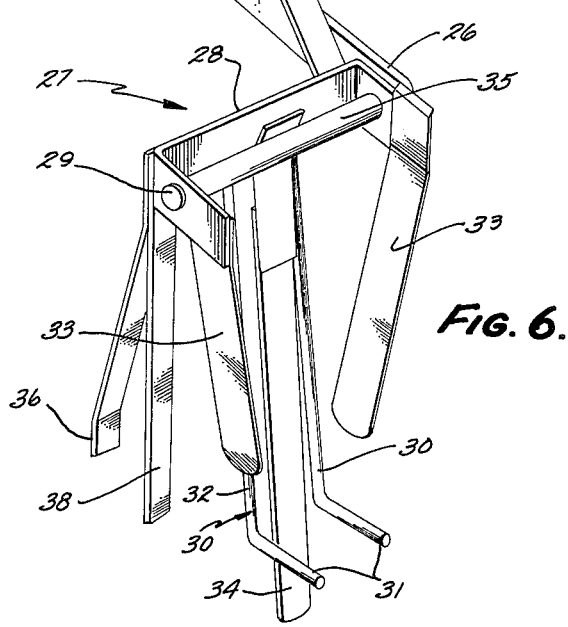
FIG. 6 is an enlarged perspective view of the plant grasping element.

A plurality of arms 25 are rigidly secured to the rotatable member 5. A pot grasping element 27 is pivotally secured to the free end of each of the arms 25. Each pot grasping element 27 (FIG. 6) includes a frame 28 rotatably receiving the shaft 29 secured to the arm 25. A pair of bent rods 30 are secured to the frame 28, the bent rods 30 forming a pot supporting surface defined by the sections 31 and 32 lying at an angle one with respect to the other. A pair of spaced flexible fingers 33 are secured to the frame 28, lying generally at the sides of the pot supporting surface formed by the spaced rods 30. It will be seen (FIGS. 2 and 6) that the bottom of the pot rests on the sections 31 of the rods 30. One side of a pot rests against the sections 32 of the rods 30. The flexible fingers 33 then grasp two opposed sides of a pot, thus providing support at the bottom and three sides of the pot. A flexible prong 34 is secured to the collar 35, the collar 35 enveloping the shaft 29, thus rotatably securing the prong 34 to the pot grasping element 27. It will be noted that the flexible prong 34 swings between the rods 30, thus is swingable through the supporting surface provided by the rods 30. A plurality of cam followers 36, 37 and 38 are secured to the frame 28 of the pot grasping element 27, the purpose of which will be more fully explained hereinafter.

Figure 5:
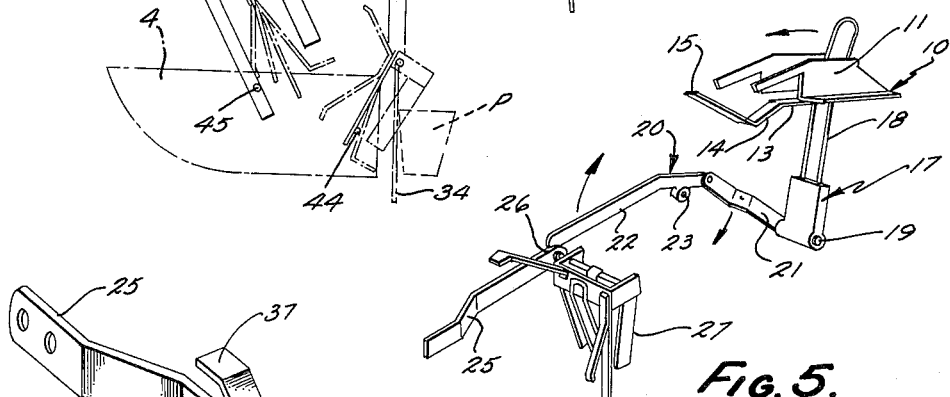
FIG. 5 is a perspective, side view showing the automatic pickup of a pot by the plant grasping element.

As noted hereinbefore, a pot platform 10 is provided at the rear of the machine 1. The pot platform 10 comprises (FIG. 5) a track, the track bent to include a rearward horizontal portion 13 and sloping portions 14 and 15, the purpose of which will be explained hereinafter. Side walls 11 are provided adjacent the track so that a pot may be better retained on the horizontal portion 13. As shown in FIGS. 2 and 5, a pot pusher 17 is pivotally mounted at the rear of the machine, the pusher 18 positioned in back of the pot platform 10 for movement along the track described. The pot pusher 17 pivots about an axle 19 mounted on the frame 7 of the machine. A linkage 20 is secured to the pot pusher 17, the linkage 20 including the arm 21 rigidly secured to the pusher 18 and the arm 22 pivotally secured to the end of the arm 21. The arm 22 is pivotally secured to the axle 23 secured to the frame 7 of the machine (FIGS. 1 and 5). A spring 24 interconnects the arm 21 of the linkage 20 and the frame 7 of the machine such that the pusher 18 is normally rotated to be biased to the position shown in FIGS. 1 and 3, in back of the pot platform 10. As shown in FIG. 5, it will now be understood that as the arm 22 moves upwardly as shown by the arrow, the arm 21 will be forced downwardly as shown by another arrow since rotation is about the axle 23. This will in turn cause the pusher 18 to move forwardly in the direction shown by an arrow since rotation is about the axle 19. Thus, the pusher 18 will move along the track between the side walls 11, pushing a pot set on the horizontal portion 13 of the track to a position lying on the sloping portions 14 and 15 of the track for pickup by pot grasping elements 27 which will be described hereinafter.

A curved cam 40 (FIG. 4) is mounted on the frame 7 of the machine, positioned such that the cam follower 36 of the pot grasping element 27 engages it during the circuitous movement of the elements in the direction of the arrow 41 through rotation of the rotatable member 5. The cam 40 is shaped such that as the cam follower 36 engages it the pot grasping element 27 swings upwardly to a generally horizontal position. During this time, the end 26 of the associated arm 25 engages the end of the arm 22 of linkage 20 of the pot pusher 17. This causes the pot pusher to react as explained hereinbefore, placing a pot in a generally horizontal position where the sections 32 of the rods 30 pass around the track of the pot platform, picking up a pot and supporting it on the pot grasping element as explained hereinbefore. Thus, it will be noted that a worker riding on the machine need only place a pot on the pot platform 10. No special alignment or fitting is necessary. From that point on, the machine automatically operates to pick up the pot, grasp it properly and safely, and transport it for plating as will now be described.

The cam 40 is shaped such that the pot grasping element positions the pot in a position between the horizontal and the vertical as the associated arm 25 continues its circuitous movement through the rotatable member 5. A cam 42 is mounted on the frame 7 at the forward end of the machine (FIGS. 1 and 4). The cam 42 is positioned such that just as the cam follower 36 leaves the cam 40, the cam follower 37 picks up the cam 42. The cam 42 is shaped such that as the pot grasping element continues its circuitous movement, the element is gently rotated to a position closer to the vertical. A cam 43 is mounted on the frame 7 at the forward end of the machine, positioned such that as the cam follower 37 leaves the cam 42, the cam follower 36 picks up the cam 43. Cam 43 gently guides the pot grasping element 27 and its pot downwardly towards the furrow being dug by the means 4 described hereinbefore. As shown in FIG. 3, a tripping cam 44 is secured on the means 4 just above the furrow being dug. The tripping cam 44 is positioned to engage the tripping cam follower 38 on the pot grasping element 27. As the rotatable member 5 continues its circuitous movement, the pot grasping element 27 is tipped forwardly so that the supporting surface is removed from the pot. During this time, the flexible prong 34 engages the ground due to the forward movement of the machine 1 as shown by the arrow 3. This causes the flexible prong to move through the supporting surface formed by the rods 30 of the pot grasping element 27. Thus, the prong actually forces the pot P from its supporting surface as shown in FIG. 4, and continues to hold the pot P in a perpendicular position while the soil is forced back around the pot P, thus preventing the pot P from leaning forward caused by the forward movement of the soil as the machine travels in a forward direction. This is an important and special feature, especially in heavier soils, which when forced together from both sides of the pot in a forward movement will tip the pot and remain set in too much of a slant. Further circuitous movement of the arm 25 raises the pot grasping element above the planted pot through the tripping cam 44 engaging the tripping cam follower 38 of the pot grasping element. As the machine moves forward and the tripping cam follower 38 leaves the tripping cam 44, the pot grasping element 27 pivots to rise to the position adjacent the pot platform 10 as described hereinbefore. It should be noted that a protrusion 45 is provided on the means 43 to make certain that the tripping cam follower 38 engages the tripping cam 44, the protrusion 45 aligned with the cam follower 37 and preventing enough upward swinging for possible missing of the cams.

Assembly and operation

The machine is assembled as described, a pot grasping element 27 as described pivotally secured to the end of each of the arms 25. The machine 1 is drawn forwardly along the ground in the direction designated by the arrow numbered 3. Through the chain 9, circuitous movement is given to the rotatable member 5, causing the arms and their pot grasping elements 27 to move in a circuitous path in a direction designated by the arrow numbered 41. As stated hereinbefore, trays may be provided for carrying a large quantity of pots to be planted. Workers ride the machine and simply deposit these potted plants on the pot platform 10. This is the worker's only function as noted. The pot grasping elements progressively move upwardly, the ends 26 of the arms 25 through the linkage 20 and the pot pusher 17 moving the pots P to a position such that the elements 27 pick them up through proper positioning by the cam follower 36 and the cam 40. The pot P is then progressively carried through a circuitous path and planted as described, the furrow being covered by the machine in a manner old and well-known.

It will be seen that this invention has provided an entirely new concept in the art of pot planting. This new concept provides for better handling and transporting of plants, the pot grasping elements being rotatably attached to the arms. Further, the pots are better aligned for planting due to the automatic pot pickup. The mere placing of a pot on the pot platform absolutely assures that it will be properly grasped by the pot grasping element. Further, proper transporting and gentle handling of the potted plant is provided as the pot grasping element continues its circuitous movement. Additionally, at the perfect moment as dictated automatically by the various cams and cam followers described, the pot is tripped and removed from the pot grasping element and set into the ground. Again, this is entirely automatic. It will be seen that this structure is extremely sure and positive in function and operation, even though preciseness on the part of the workers required hereinbefore is eliminated.

While only one embodiment of this invention has been shown and described, it may be possible to practice the invention through the utilization of certain other embodiments without departing from the spirit and scope thereof. Such other embodiments are to be included as part of this invention unless the following claims specifically state otherwise.

I claim:

1. A machine for planting potted plants, including: means for moving the machine along the ground; at least one arm associated with said machine; means for providing circuitous movement to said arm as the machine moves along the ground; a pot grasping element pivotally secured proximate the free end of said arm; a tripping means for removing a pot from said element as said element engages the ground; a pot platform on which potted plants may be deposited; a pot mover movably secured to the machine and normally positioned adjacent said platform; a linkage associated with said pot mover; and said linkage lying in the path of said arm, whereby said arm through said linkage moves said pot mover across the surface of said pot platform toward said pot grasping element.

2. A machine as defined in claim 1, including a cam, said pot grasping element including a cam follower, said cam and cam follower positioned such that said pot grasping element is pivoted toward a horizontal position for reception of a potted plant being moved by said pot mover from said pot platform.

3. A machine as defined in claim 2, said pot platform including a track having a horizontal portion and sloped portions, said pot mover movable along said track.

4. A machine as defined in claim 3, said pot mover spring biased to said normal position adjacent said platform.

5. A machine as defined in claim 2, said pot grasping element comprising a supporting surface and a pair of spaced flexible fingers for yieldingly engaging a pot.

6. A machine as defined in claim 2, said pot grasping element comprising a supporting surface and a pair of spaced flexible fingers for yieldingly engaging a pot, said tripping means including a prong pivotally secured to said pot grasping element and extending therebelow and adapted to pass through said supporting surface upon engaging the ground, thereby forcing the pot from between said flexible fingers.

7. A machine as defined in claim 6, said prong being yieldingly flexible.

8. A machine as defined in claim 6, said supporting surface comprising a pair of bent rods spaced from one another.

9. A machine for planting potted plants, including: means for moving the machine along the ground in the direction of the crop row to be planted; a plurality of arms rigidly secured to a member rotatably supported on the machine for rotation through a generally vertical plane in the same direction as said movement of the machine; a pot grasping element pivotally secured to the free end of each of said arms, each of said elements comprising a supporting surface and a pair of spaced flexible members for yieldingly engaging a pot; a pot platform positioned rearwardly of said rotatable member on which potted plants may be deposited; a pot mover pivotally secured to be normally positioned adjacent said platform; a linkage associated with said pot mover; said linkage lying in the path of said arms, whereby said arms through said linkage pivot said pot mover across the surface of said platform for depositing pots on associated pot grasping elements; a first cam mounted proximate said platform; first cam followers on each of said pot grasping elements, said first cam and first cam followers pivoting said elements toward a horizontal position for reception of a potted plant being moved by said pot mover from said pot platform; additional cams mounted on said machine and additional cam followers mounted on each of said pot grasping elements, said additional cams and additional cam followers positioned to guide said elements through a predetermined path for proper support of pots held therein; a tripping cam mounted generally at the bottom of the machine and a tripping cam follower on each of said pot grasping elements positioned to pivot said elements to place and dump pots carried thereby when said elements engage the ground.

10. A machine as defined in claim 9, each of said pot grasping elements including a prong pivotally secured thereto and extending therebelow and adapted to pass through said supporting surface upon engaging the ground, thereby forcing the pot from between said flexible fingers.

11. A machine as defined in claim 10, said prong being yieldingly flexible.

12. A machine as defined in claim 10, said supporting surface of each of said pot grasping elements comprising a pair of bent rods spaced from one another.

13. A machine as defined in claim 9, said pot platform including a track having a horizontal portion and sloped portions, said pot mover movable along said tracks.

14. A machine as defined in claim 13, said pot mover spring biased to said normal position adjacent said platform.

15. A machine for planting potted plants, including: means for moving the machine along the ground; at least one arm associated with said machine; means for providing circuitous movement to said arm as the machine moves along the ground; a pot grasping element pivotally secured proximate the free end of said arm, said pot grasping element comprising a supporting surface and a pair of spaced flexible fingers for yieldingly engaging a pot; a tripping means for removing a pot from said element as said element engages the ground, said tripping means including a prong pivotally secured to said pot grasping element and extending therebelow and adapted to pass through said supporting surface upon engaging the ground, thereby forcing the pot from between said flexible fingers.

16. A machine as defined in claim 15, said prong being yieldingly flexible.

17. A machine as defined in claim 15, said supporting surface comprising a pair of bent rods spaced from one another.

References Cited by the Examiner

UNITED STATES PATENTS

| 1,806,622 | 5/1931 | Gibbens | 111—3 |
| 3,078,816 | 2/1963 | Poll | 111—2 |

FOREIGN PATENTS

| 45,369 | 2/1932 | Denmark. |
| 637,608 | 5/1928 | France. |
| 1,081,202 | 12/1954 | France. |
| 852,113 | 10/1960 | Great Britain. |

ABRAHAM G. STONE, *Primary Examiner.*

WILLIAM A. SMITH III, *Examiner.*